United States Patent
Bruns (10) Patent No.: US 6,232,566 B1
(45) Date of Patent: May 15, 2001

(54) APPARATUS IN A LIFTING DEVICE FOR REDUCING ERROR IN WEIGHT MEASUREMENTS

(75) Inventor: Robert W. Bruns, Carmichael, CA (US)

(73) Assignee: Gagetek Technologies, Holdings Company, Carmichael, CA (US)

( * ) Notice: Subject to any disclaimer, the term of this patent is extended or adjusted under 35 U.S.C. 154(b) by 0 days.

(21) Appl. No.: 09/351,865

(22) Filed: Jul. 12, 1999

(51) Int. Cl.[7] .................. G01G 19/08; G01G 19/10; G01G 19/14; G01G 23/01
(52) U.S. Cl. .................. 177/139; 177/141; 177/147; 73/113; 702/101
(58) Field of Search .................. 177/136, 141, 177/146, 147, 139; 701/50; 702/174, 101, 102; 73/1.13

(56) References Cited

U.S. PATENT DOCUMENTS

| | | | |
|---|---|---|---|
| 2,582,886 | 1/1952 | Ruge | 73/141 |
| 2,813,709 | 11/1957 | Brier | 265/42 |
| 4,212,360 | 7/1980 | Chesher | 177/139 |
| 5,139,101 | 8/1992 | Smith | 177/139 |
| 5,195,418 | 3/1993 | Smith | 91/31 |
| 5,287,885 | 2/1994 | Smith | 137/596 |
| 5,461,933 | 10/1995 | Ives et al. | 73/862 |
| 5,509,293 | * 4/1996 | Karumanchi | 177/25.14 |
| 5,666,295 | * 9/1997 | Burns | 177/141 |
| 5,783,755 | 7/1998 | Bruns | 73/862 |
| 5,824,963 | * 10/1998 | Burns et al. | 177/136 |
| 5,925,832 | * 7/1999 | Burns | 73/862.635 |

OTHER PUBLICATIONS

Denco Sales Co. data sheet, "Scotchlite Reflective Sheeting", Mar. 31, 1995.

* cited by examiner

Primary Examiner—Randy W. Gibson
(74) Attorney, Agent, or Firm—Thomas Schneck (57) ABSTRACT

A device for lifting a load includes a carriage supported by one end of a chain. The chain passes over a sprocket wheel (mast roller) atop a hydraulically operated telescoping element and is anchored at a second end. In a first embodiment of the invention, an equalizing scheme for reducing errors in measuring the weight of the load includes providing a chain and sprocket-wheel having dimensions such that the rollers comprising each link of the chain span a predetermined portion of the circumference of the sprocket-wheel. In a second embodiment of the invention, the equalizing scheme includes a force sensor coupled to sense a force in connection with movement of the load thus generating a series of force measurements, the measurements being proportional to the weight of the load. The measurements are taken over a predetermined rotational movement of the sprocket-wheel and averaged to produce a value that is an accurate reflection of the weight of the load.

10 Claims, 5 Drawing Sheets

APPARATUS IN A LIFTING DEVICE FOR REDUCING ERROR IN WEIGHT MEASUREMENTS

CROSS-REFERENCE TO RELATED APPLICATIONS

This application is related to application Ser. No. 08/812,995 filed Mar. 4, 1997 now U.S. Pat. No. 5,783,755, application Ser. No. 08/812,999 filed Mar. 4, 1997 now U.S. Pat. No. 5,824,963 and application Ser. No. 08/942,314 filed Oct. 1, 1997.

TECHNICAL FIELD OF THE INVENTION

The present invention pertains to the field of weight sensing systems. Specifically, the present invention pertains to an apparatus for reducing errors in weight measurements in hydraulic lifting devices.

BACKGROUND ART

In the past, there has been great interest in determining the load carried on trucks for hire. Loads carried by trucks are often supported by pallets because pallets provide a stable platform on which to position and transport goods between trucks, using a hydraulic lifting device. Typically, prior art weight sensing devices are concerned with measuring the change in the gross weight of a truck to determine whether it complies with regulations relating to the loading of commercial motor vehicles and/or determining the amount to charge a customer for transportation of a particular load. This does not allow determining the weight of individual pallets of goods before loading the pallets onto the truck, which may result in overloading of the same.

To prevent overloading of the truck, the pallets of goods may be individually transported to a scale where they are then weighed. A problem with this procedure is that it is time consuming, resulting in increased transportation costs for a given load. An obvious solution to this problem would be to provide a scale for each truck receiving a load, thereby providing dynamic weighing of the total load of the truck as pallets of goods are placed thereon. This would require having a separate scale for each truck receiving pallets of goods, or creating a queue of trucks for each scale present so that each may in turn be placed on the scale during loading. Both of these solutions result in the same drawbacks as individually weighing pallets of goods.

Prior art attempts have been made for weighing of loads on forklifts. Weigh-Tronix, Inc. describes, in a sales brochure, a device for weighing loads supported by a forklift. The Weigh-Tronix device includes a large frame fitting between the carriage and a pair of forks. The frame is mounted parallel to the carriage and includes two plates parallel to the carriage and the forks. The first plate is affixed to the carriage of the forklift. The second plate is constructed similarly to the forklifts original carriage, and serves as the attachment point of the forks. Load cells are mounted between the plates. These load cells deflect as the load is placed on the forks, causing the two plates to deflect vertically with respect to each other, while remaining parallel. The drawback with this system is the construction of the two plates requires substantial material. This, coupled with the shift of the load center away from the forklift, results in a reduction in capacity in capacity for the forklift. In addition it is expensive to manufacture and transport to the end user. The load cell in this system are also subject to fatigue and may deform if overloaded, making the device susceptible to premature failure.

To overcome the excessive weight of the frame, prior art devices have placed a weight transducer in the hydraulic lift circuit. In this manner, a portion of the hydraulic fluid is transmitted along a bypass from the main lift circuit. A transducer is positioned to measure the pressure of the fluid in the bypass.

U.S. Pat. Nos. 5,287,885; 5,195,418; and 5,139,101 to Smith each discloses such a bypass system. Specifically, a motion control system for hydraulically operated lifting devices is shown including, in pertinent part, a two-way valve having a normally open valve in one chamber and a normally closed valve in another chamber. The normally open valve may be closed to re-direct flow of hydraulic fluid from a main valve, under pressure from a hydraulic pump, to a bypass chamber having a flow control valve. The normally closed valve may be opened to direct flow from a lift circuit of the second flow control valve to pass the hydraulic fluid back to a hydraulic fluid reservoir tank. These bypass systems are, however, slow to operate and may not be operated during the normal course of the forklift's operation. They are also susceptible to error from the chains of the lift, as will be described herein.

Load cells overcome the drawbacks of hydraulic bypass systems. U.S. Pat. No. 5,461,933 to Ives et al. discloses a compressive load cell having a shear web design. The load cell includes, in pertinent part, an annular body concentrically disposed about a longitudinal axis of a cylindrical body. Two pairs of flexible webs interconnect the annular body, with each web in a pair disposed opposite of the remaining web. The webs are spaced-apart about the cylindrical body, 90° from an adjacent web. Two strain-gauges are attached to each web on opposing surfaces. The strain-gauges are connected in a wheatstone bridge configuration, which is provided with thermally-compensating potentiometers.

U.S. Pat. No. 4,212,360 to Chesher discloses a load weighing system for a forklift. The system includes, in pertinent part, load cell transducers disposed to measure compressive forces exerted between a supporting chain and the anchorage of the chain. The chain supports the carriage to which lifting forks of the forklift are attached. The load cell transducers are formed from a spool-shaped body that has a plurality of resistive strain-gauge elements affixed to it using a suitable adhesive. The strain-gauge elements are connected in a bridge arrangement such that the degree of unbalance of the bridge is a measure of the magnitude of the compressive forces applied across the ends of the spool-shaped body.

U.S. Pat. No. 2,813,709 to Brier discloses a strain-gauge load cell that includes strain-gauges attached to suspension springs of trucks. Also included is a compensation gauge. The compensation gauge and the strain-gauges are both electronically coupled to a bridge circuit. The total impedance across the bridge circuit is affected by both the load on the strain-gauges and the temperature sensed by the compensation gauge. The compensation gauge is chosen so that the impedance across the bridge circuit is constant for a particular weight upon the strain-gauge regardless of the temperature of the surrounding atmosphere.

U.S. Pat. No. 2,582,886 to Ruge discloses a differential load device that includes a load cell having a load button. A helical compression spring is disposed around the load cell. The spring is chosen to receive a predetermined base weight, with any additional load, or differential load, being distributed between the load cell and the spring. The spring includes two strain-gauges on the outer surface of the wire that forms the spring. Typically, the spring is chosen so that its axial stiffness is relatively small compared to that of the load cell. In this manner, the load cell is rendered extremely sensitive to any differential load that is placed on it. The two gauges allow detection of the total load on the device, i.e. the base load and the differential load.

Many of the aforementioned load cells are directed to accurate measurements of an applied load despite environmental anomalies. Such environmental anomalies include ambient temperature fluctuations. However, the accuracy of the load measured is often degraded due to various mechanical disturbances, e.g. shaking and vibration,. as well as the position of the load on the cell.

What is needed is a lifting device capable of producing a high precision weight measurement, dynamically, without degradation of the measurement's accuracy by mechanical disturbances in the lifting device.

SUMMARY OF THE INVENTION

A lifting device comprises a frame having a telescoping element. Attached to the telescoping end of the telescoping element is a sprocket-wheel (mast roller). A chain passes over the sprocket-wheel and is attached at one end to an anchor on the frame and at the other end to a lift carriage. The chain is thus composed of two sections: the portion between the sprocket-wheel and the carriage, referred to as the load portion; and the portion between the sprocket-wheel and the anchor, referred to as the anchor portion. The lifting device includes a force sensing device to provide, either directly or indirectly, the weight of a load carried by the carrier.

The invention is based upon the discovery that, for a given load, the anchor portion of the chain is subjected to a tension that differs from the tension on the load portion of the chain as the load is being raised or lowered. The measured weight of the load therefore varies with the vertical height of the load, thus making weight determinations inaccurate. The lifting device of the present features an error correction scheme to compensate for these errors in weight determination.

In accordance with one embodiment of the present invention, the error correction scheme comprises an equalizer system to substantially eliminate variations in weight measurements, wherein the sprocket-wheel has a specific dimension relative to certain dimensions of the chain. In particular, each of the constituent links of the chain includes two rollers separated by a distance, defining a pitch. The pitch dimension and the sprocket-wheel diameter are selected so that the chain is symmetrically disposed about the center of the sprocket-wheel. This symmetry is achieved when the pitch and wheel diameter are selected so that an angle θ divides into 180° substantially an even integral number of times, where θ is the half angle subtended by two radii extending from the center of the sprocket-wheel to the centers of two adjacent rollers of the chain. It was discovered that such a symmetrical arrangement of the chain about the sprocket-wheel ensures that the load portion and the anchor portion of the chain experience the same tension force during lifting or lowering of the load.

In accordance with a second embodiment of the present invention, the error correction scheme comprises a weight integrative weighing system. The weighing system includes a processor which accumulates force measurements from the force sensing device during lifting or lowering of the load. For example, in one variation of the second embodiment, a force transducer coupled to measure tension in the chain provides a measurement of the weight of the load. In another variation of the second embodiment, where the telescoping element is hydraulically operated, a pressure sensor provides an indication of the weight in terms of pressure readings which are readily converted to units of weight.

For the reason stated above, the force measurements vary during movement of the load. It was discovered that such variations during the movement of the load were cyclic in nature. More particularly, it was discovered that the cycle repeats itself for every 2θ° of angular displacement of the sprocket-wheel, where θ is defined above. Force measurements are collected for a predetermined duration during movement of the load. The collected data is then averaged to produce an accurate value of the weight of the load.

Thus, the weighing system includes an angular displacement detector to indicate when the sprocket-wheel has rotated by an amount equal to an integral multiple of 2θ°. This information is fed into the processor so that the force measurements can be averaged over a proper range of motion, namely any integral multiple of 2θ° of rotation of the sprocket-wheel. The processor averages the measurements and produces a corresponding weight measurement.

BEST MODE FOR CARRYING OUT THE INVENTION

Figure 1:
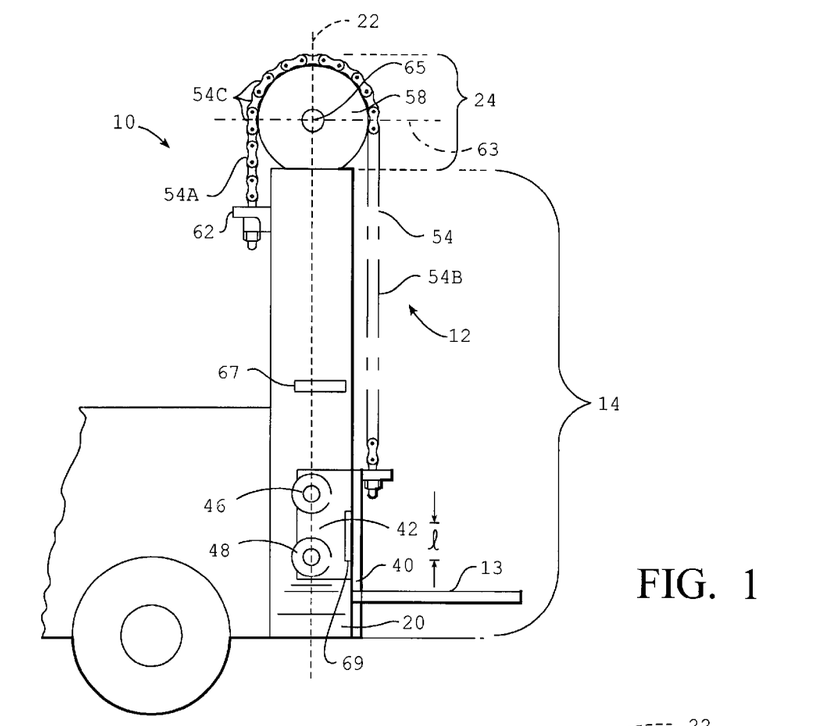
FIG. 1 is a side view of a mast for a forklift apparatus.
Figure 2:
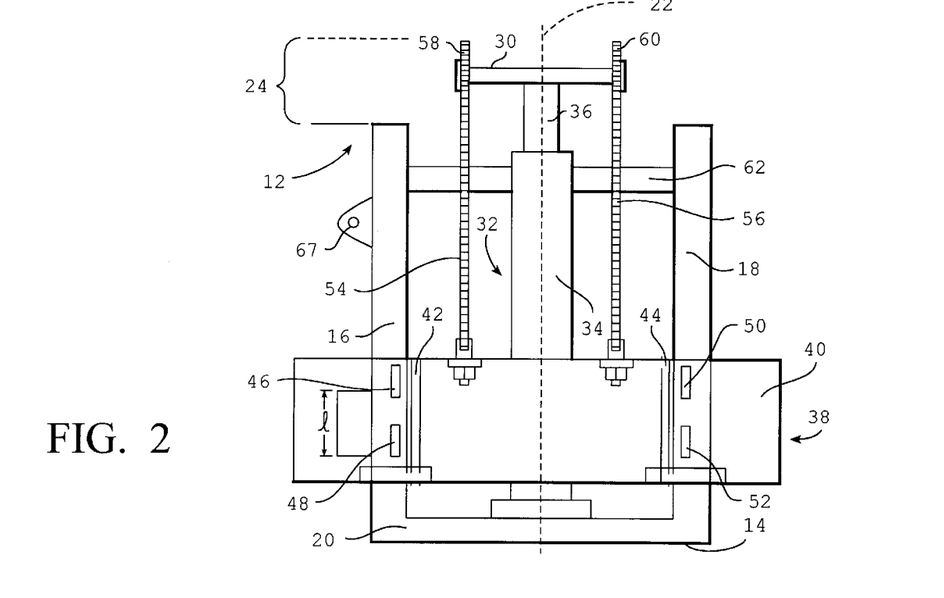
FIG. 2 is a front elevational view of the mast shown in FIG. 1.

With reference to FIGS. 1 and 2, a forklift truck 10 has a mast assembly 12 comprising a generally U-shaped bottom mast section 14 having a pair of spaced-apart and parallel hollow legs 16 and 18 secured to a base member 20 extending therebetween. A longitudinal axis 22 of the bottom mast section 14 is disposed substantially vertical to a chassis of the forklift truck 10. A top mast portion 24 is coupled to a hydraulic ram 32. The ram has a cylinder 34, mounted on the base member 20, and a piston rod 36, connected to an axle 30. The hydraulic ram 32 positions the top mast section 24, with respect to the bottom mast section 14, between extended and retracted positions.

A carriage assembly 38 includes a plate-like member 40 that extends parallel to base member 20. Brackets 42 and 44 are secured to the member 40. Brackets 42 and 44 extend from member 40 in a direction transverse to base member 20. A fork 13, or other load bearing member, extends from member 40, in a direction opposite to brackets 42 and 44-and opposite to transverse member 20.

Carriage support chains 54 and 56 pass over respective sprockets 58 and 60 which are supported by axle 30. Each support chain 54 and 56 is secured, at one end, to the carriage assembly 38. The remaining end of each support chain 54 and 56 is secured to an anchor member 62. In this fashion, each chain 54 and 56 forms two spaced-apart and opposing portions, shown in FIG. 2 with respect to chain 54 as anchor portion 54a and load portion 54b. Anchor portion 54a extends from anchor member 62 and terminates proximate to longitudinal axis 22. Load portion 54b extends from carriage assembly 38 and terminates proximate to longitudinal axis 22. The anchor member 62 is attached to the bottom mast section 14, on the side opposite to the carriage assembly 38.

Figures 3, 4, 5:
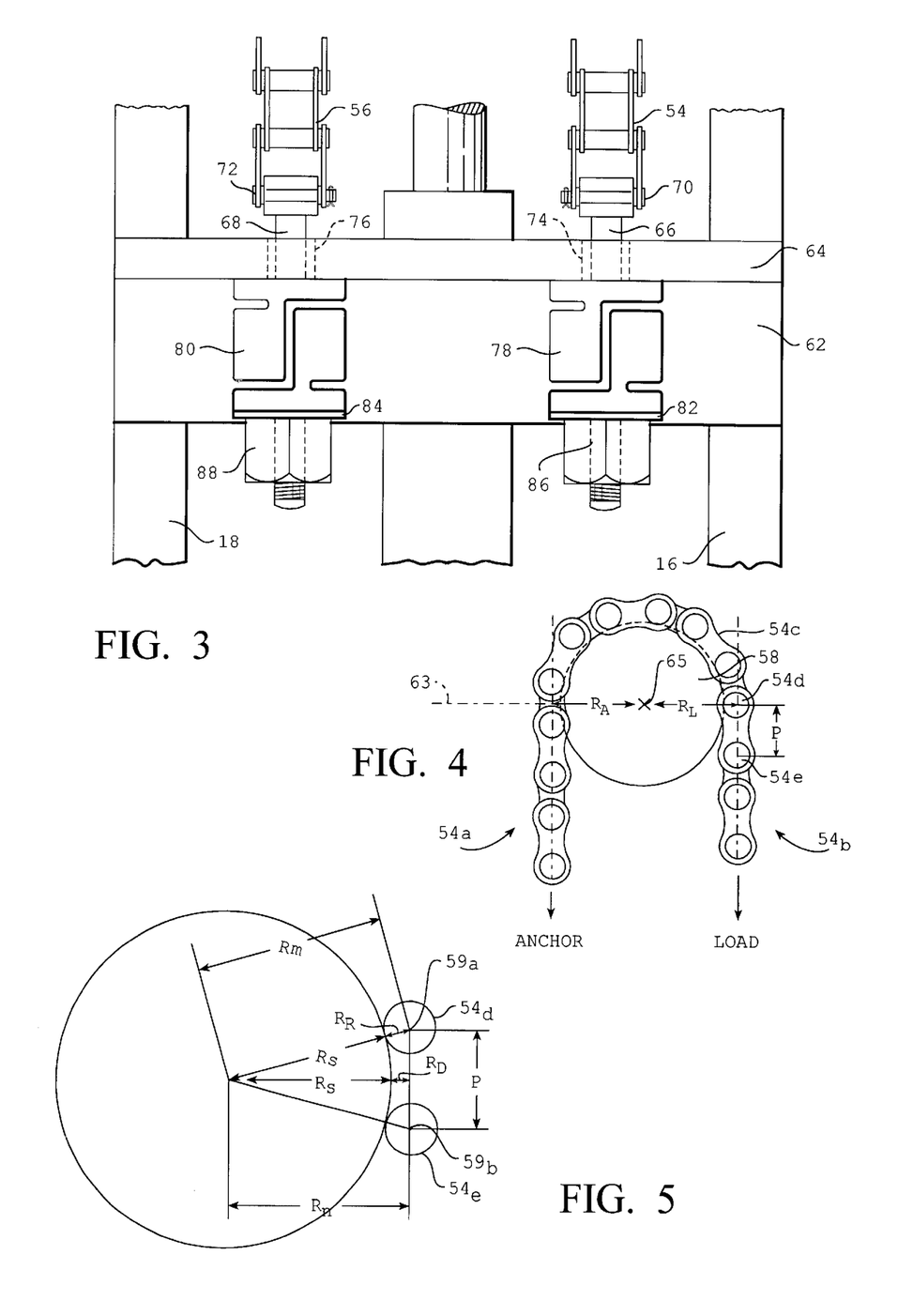
FIG. 3 is an enlarged detailed view of a chain anchorage assembly shown in FIGS. 1 and 2.
FIG. 4 is a side plan view of a sprocket-wheel and chain of the forklift shown in FIG. 1.
FIG. 5 is a detailed schematic view of a sprocket-wheel and a chain shown in FIGS. 1 and 4.

With reference to FIG. 3, the anchor member 62 comprises an L-section girder secured (e.g. by welding) to the legs 16 and 18, so that a flange 64 of the anchor member 62 projects horizontally outward past the plane of the legs 16 and 18. Eye-bolts 66 and 68 are secured to the ends of the chains 54 and 56 by respective pins 70 and 72. The shanks of the eye-bolts 66 and 68 pass through respective clearance holes 74 and 76 in the flange 64. Load cell transducers 78 and 80 are fitted over the shanks of the eye-bolts 66 and 68 between the underside of the flange 64 and respective washers 82 and 84 and retaining nuts 86 and 88. In supporting the carriage assembly 38, and any load carried on it, the pull on the chains 54 and 56 exerts compressive forces on the load cell transducers 78 and 80.

Referring to FIGS. 1–4, it was recognized that the load sensed at the load cell transducers 78 and 80 was not the actual load present on the carriage assembly 38. Upon further investigation, it was observed that the load sensed varied as a function of the relative geometry of the sprocket-wheel and the chain, which will be discussed with respect to sprocket-wheel 58 and chain 54, but applies equally with respect to sprocket-wheel 60 and chain 56. Specifically, it was discovered that the load on the anchor portion 54a differed from the load on the load portion 54b. This results from the geometry of each link that forms each chain 54 and 56. For example, chain 54 includes a plurality of links 54c, each of which includes two rollers 54d and 54e separated by a distance, defining a pitch P. As the piston 36 moves upward, a force $F_p$ is imparted upon the sprocket-wheel 58 which loads both the anchor and load portions 54a and 54b of the chain 54. The effective force, $F_{ANCHOR}$, placed upon the anchor portion 54, and sensed by the load cell transducer 78, may be defined as follows:

$$F_{ANCHOR} = F_{LOAD}(R_L/R_A) \quad (1)$$

where $F_{LOAD}$ is the force on the load portion 54b and $R_A$ is the distance between the center of anchor portion 54a and the axis of rotation 65 of the sprocket wheel 58, measured parallel to the axis 63. $R_L$ is the distance between the center of load portion 54b and the axis of rotation 65 of the sprocket wheel 58, measured parallel to the axis 63. Both $R_A$ and $R_L$, however, vary while the carriage 38 is moved along the mast 12 due to the geometry of the chain 54.

Referring to FIGS. 4 and 5, when one of the two rollers 54d and 54e, that form a link, lies along axis 63, either $R_A$, $R_L$ or both may be equal to the radius of sprocket wheel 58, $R_S$, plus the radius of the roller 54d or 54e, $R_R$, defining a maximum radius $R_M$. Upon axis 63 bisecting the pitch P of each link, $R_A$, $R_L$ or both may measure distance $R_N$, which is less than $R_M$, defining a minimum distance. The minimum distance $R_N$ is simply $R_S$ plus $R_D$, the distance from the center of the link to the edge of the sprocket wheel 58. As the sprocket-wheel 58 rotates about axis 65, $R_A$ and $R_L$ each moves cyclically between distances $R_M$ and $R_N$. Based upon equation (1), it can be seen that this cyclical change in measurement for $R_A$, $R_L$ causes the actual force upon anchor portion 54a to differ from the force disposed upon load portion 54b, unless $R_A$ equals $R_L$, i.e., the ratio of $R_L/R_A$ is a constant. This introduces an error in the load sensed by the load cell transducer 78.

To avoid this error, an equalizer system is employed which ensures that $R_A$ equals $R_L$ so that the chain 54 hangs symmetrically about sprocket-wheel 58, with each link 54c subtending a predetermined portion of the circumference of the sprocket-wheel 58. It was determined that the aforementioned symmetry is present when the relative geometry of the sprocket-wheel 58 and the chain 54 is defined as follows:

$$\theta = 180°/2n \quad (2)$$

where $\theta$ is the half angle, measured between two radii extending from the axis 65, that is subtended by centers 59a and 59b. The variable n is an integer. Thus, the equalizer system would include providing the chain 54 and the sprocket-wheel 58 with the physical characteristics so that equation (2) is satisfied. This abrogates measurement errors in the load cell transducers by ensuring the force present on the anchor system portion 54a is substantially similar to the force on the load portion 54b.

Referring to FIGS. 1 and 5, in an alternative embodiment, the equalizer system may be abrogated by taking advantage of the cyclical nature of the aforementioned error. That is, the measurement $R_A$ or $R_L$ is a constant for every $2\theta$ angles of rotation of the sprocket-wheel about axis 65. Specifically, for every $2\theta$ angle of rotation of sprocket-wheel 58, the following may be shown:

$$\frac{\int_0^{2\theta} R_A \, d\theta}{2\theta} = \frac{R_M + R_N}{2}; \quad (3)$$

and $$\frac{\int_0^{2\theta} R_A \, d\theta}{2\theta} = \frac{R_M + R_N}{2} \quad (4)$$

Based upon equations (3) and (4), by substitution, equation (1) effectively becomes:

$$2F_{ANCHOR} = 2F_{LOAD}(R_M + R_N)/(R_m + R_N) \quad (5)$$

where $R_M$ and $R_N$ are defined above. Thus, by calculating the average load sensed by the load cell transducers during the movement of sprocket-wheel 58 through angular movement equal to multiples of $2\theta$, an accurate measurement of the load on carriage 38 may be determined.

One manner in which to sense the rotational movement of the sprocket-wheel 58 is to provide indicia upon sprocket-wheel 58 demarking increments of $2\theta$. A detector could be positioned to sense the indicia. However, it is preferred to observe the relative movement between the top mast section 24 and the bottom mast section 14. Specifically, the angular movement of $2\theta$ in the sprocket-wheel 58 corresponds to 2P of movement of the carriage in a direction parallel to gravity, where P is the pitch defined by each link in the chain 54. By detecting the relative movement between the mast sections 14 and 24, the rotational movement of the sprocket-wheel 58 may be sensed. One manner in which to detect 2P of relative movement is to attach a proximity sensor to one of the mast sections 14 or 24 so as to be in data communication with the remaining mast section 14 or 24.

In one embodiment, the proximity sensor is an optical detector 67 attached to the lower mast portion 14 so as to be selectively placed in data communication with an optically responsive strip 69 attached to the carriage 38. The strip 69 is chosen so that it has a length l equal to multiples of 2P. For example, the length l may be equal to 2P, 4P, 6P, etc. The strip 69 is attached to platelike member 40 so that its longitudinal axis extends parallel to axis 22. In this fashion, load measurements could occur during movement of the sprocket-wheel through angles 2θ, 4θ, 6θ, etc. Although any type of detector may be used, it is preferred that detector 67 is a photoelectric sensor sold by Honeywell under catalog number CP18LDNL2. Similarly, any type of optically responsive strip may be employed, however, it is preferred that optically responsive strip 69 is reflective sheeting manufactured by 3M Company, St. Paul, Minn. and sold under the catalog number 580-10.

An important consideration in obtaining accurate measurements is sensing the load while the carriage 38 travels at a constant rate. To that end, the detector 67 is positioned to sense the strip at a point about 12 to 15 inches from base member 20. At this point, the acceleration of the carriage has ceased. Although detector 67 has been described as employing a photoelectric detector, the detector 67 may include a magnetic sensor, such as the type sold by Honeywell under the designation SR3 series. As a result, strip 69 would comprise of a magnetic stripping.

Figure 6:
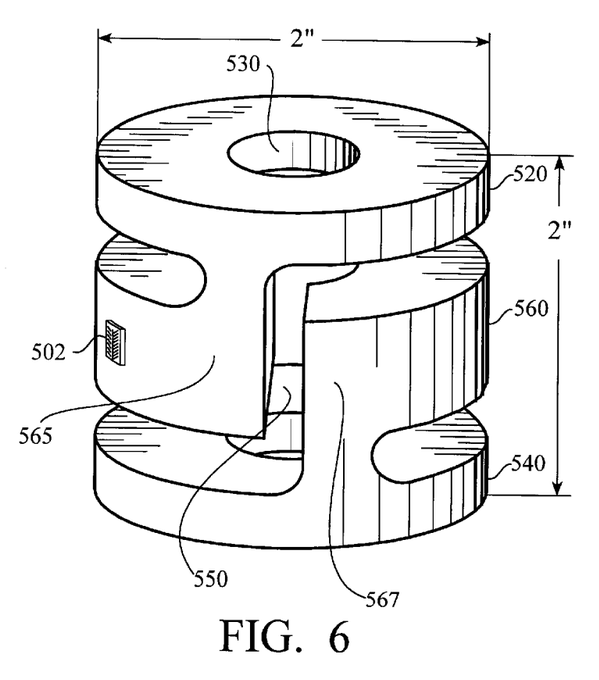
FIG. 6 is a view of a load cell shown in FIG. 3.

Referring to FIGS. 3 and 6, load cells 78 and 80 each is preferably a torsional sensing load cell 500 as shown in FIG. 6, and as fully disclosed in pending U.S. application for patent, identified as Ser. No. 08/942,314 filed Oct. 1, 1997 and assigned to the assignee of the present invention, herein incorporated by reference.

Briefly, load cell 500 consists of a body member 560 that has a split to form a gap 550. An upper loading platform 520 is attached to one end 565 of the gap and a bottom loading platform 540 is attached to the other end 567 of the gap. A first transducer 502 is disposed on body member 560 and a second transducer (not shown) is disposed on body member 560 in diametrically opposed relation to transducer 502. An axial opening 530 passes through the load cell.

As can be seen in FIG. 3, load cells 78 and 80 are mounted by fitting eye-bolts 66 and 68 through their respective openings 530. The respective upper loading platforms 520 support flange 64. The respective bottom loading platforms 540 bear upon washers 82 and 84. When the platforms are subjected to a compressive load, such as occurs during lifting, body member 560 experiences a torsional force. The transducers mounted to the body member sense this torsional stress.

As an example, a 5,000 lb. capacity forklift would comprise a pair of 3,000 lb. rated load cells. Each load cell would have a diameter (D) of 2 inches and a height (H) of 2 inches.

Figures 7A, 7B:
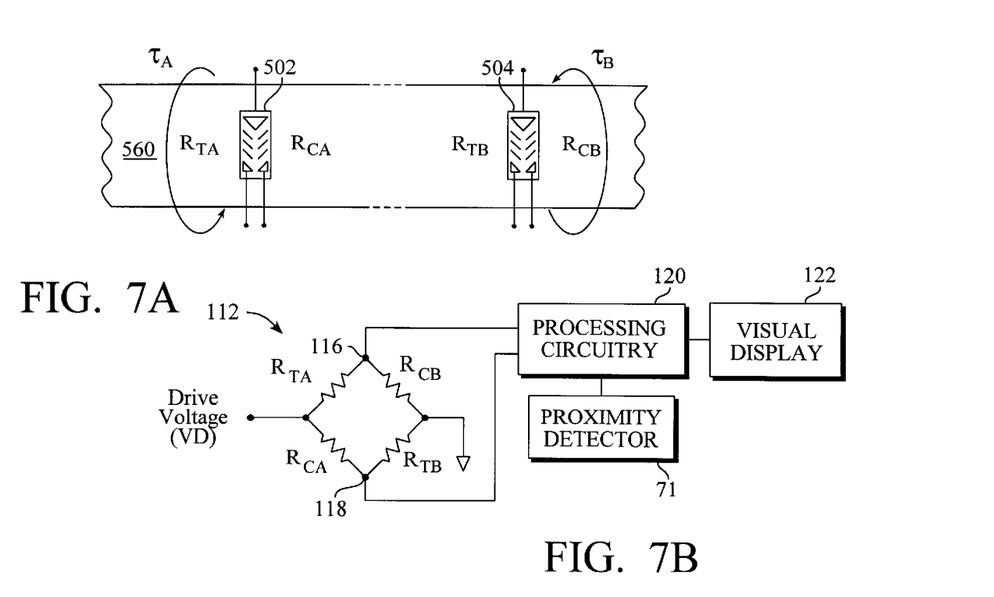
FIGS. 7A and 7B show diagrams of the electrical connection of strain-gauge elements shown in FIG. 6.

Referring now to FIGS. 7A and 7B, torsional load cell 500 is shown schematically. Transducer 502 is shown with diametrically opposed transducer 504, both mounted on body member 560. Each transducer comprises a pair of resistive strain-gauge elements; transducer 502 comprises elements $R_{TA}$ and $R_{CA}$ having a common connection, while transducer 504 comprises elements $R_{TB}$ and $R_{CB}$ having a common connection.

FIG. 7B shows the transducers coupled in a standard Wheatstone bridge configuration 112. The common connection between $R_{TA}$ and $R_{CA}$ is coupled to a drive voltage $V_D$, while the common connection between $R_{TB}$ and $R_{CB}$ is coupled to ground potential. The voltages at output nodes 116 and 118 vary depending on the strain (in this case torsional strain) sensed by the strain-gauge elements, which in turn depends on the load experienced by load cells 78, 80. The voltages are fed into processing circuitry 120, so as to transmit load measurements to the circuitry. Detector 67 (FIG. 2) is coupled to the processing circuitry and controls it such that load measurements are accumulated only for a predetermined amount of rotational movement of sprocket wheel 58. The information generated is then supplied to a visual display device 122.

Figure 9:
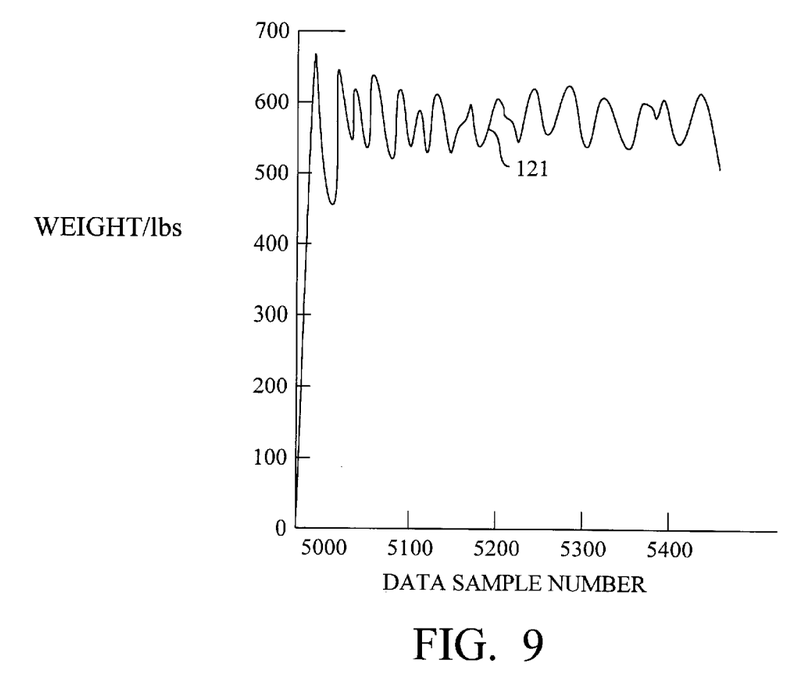
FIG. 9 is a graph depicting weight in pound, versus data sample number to demonstrate a data stream produced in accord with the present invention.

Referring to FIGS. 1, 7B and 9, in operation, the piston 32 raises carriage 38. As the detector 67 passes strip 69, it impinges a beam thereupon which is reflected back to the detector 67. So long as the detector 67 senses the beam, the proximity sensor 71 transmits a signal to the processing circuity 120, allowing the same to accumulate data samples corresponding to the load sensed. After the detector 67 has passed strip 69, the beam is no longer detected thereby, causing the proximity sensor to cease the accumulation of data by the processing circuitry 120. The processing circuitry 120 creates a data stream 121 from the load data, with each of the data samples being associated with a unique increment of the stream. The data samples are then summed and the average load sensed is calculated. The weight of the load is made visible of the visual display 122.

Figures 8A, 8B:
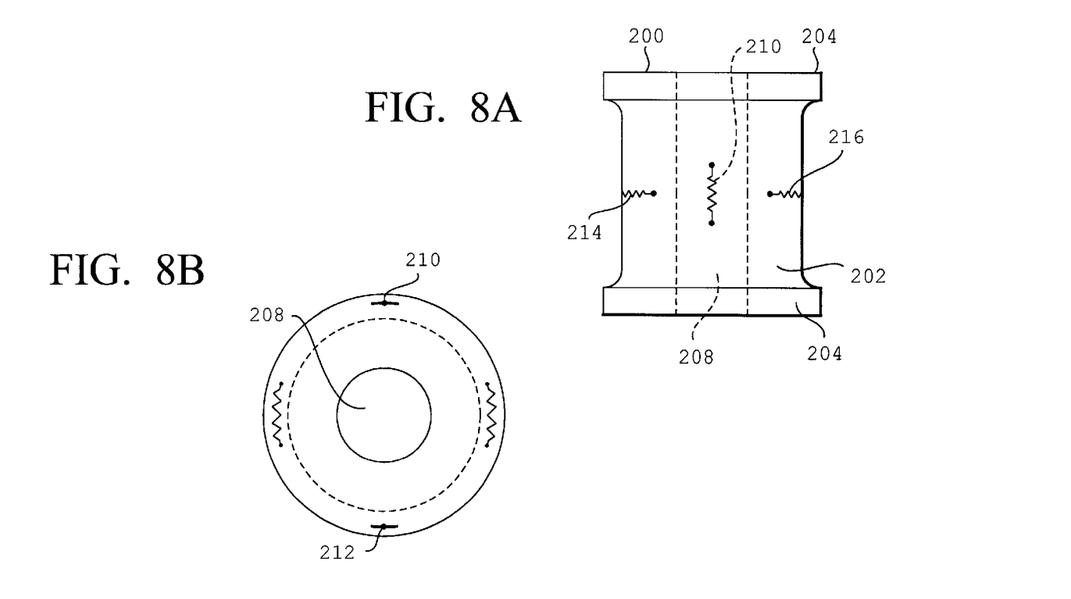
FIG. 8A is a side perspective view of a load cell as an alternate to the one shown in FIG. 6, in accord with an alternate embodiment of the present invention.
FIG. 8B is a top down view of the load cell shown in FIG. 8A.

Referring to FIGS. 3, 8A and 8B, although the load cell transducers 78 and 80 have been described as employing a torsional load cell, any load cell may be employed. For example, compressive load cell transducers may include a generally spool-shaped body 200 having a central cylindrical portion 202 disposed between end portion 204 and 206. Each of the end portions 204 and 206 are a greater diameter than that of the central portion 202. An axial bore 208 has a diameter such that the shank of eye-bolts 66 and 68 may pass freely therethrough. There is at least one resistive strain-gauge element affixed to the outer surface of portion 202 such that the element is responsive to compressive forces applied between the end surfaces 206 and 208 of the load cell transducer. Preferably, two strain-gauge elements 210 and 212 are affixed symmetrically to the central portion 202 so as to be responsive to compressive forces. Two further elements 214 and 216 are affixed so as to be affected by compressive forces as defined by Poisson's ratio. The strain-gauge members 210, 212, 214 and 216 are electrically connected as discussed above with respect to FIGS. 7A and 7B.

In addition, tension load cells may be employed in lieu of compressive load cells. One example of a tension load cell is sold by Industrial Electronic Weighing, Inc. under the tradename Criterion I. Also, other bridge configurations are known and do not add or take away from the subject matter of the invention.

Figure 10:
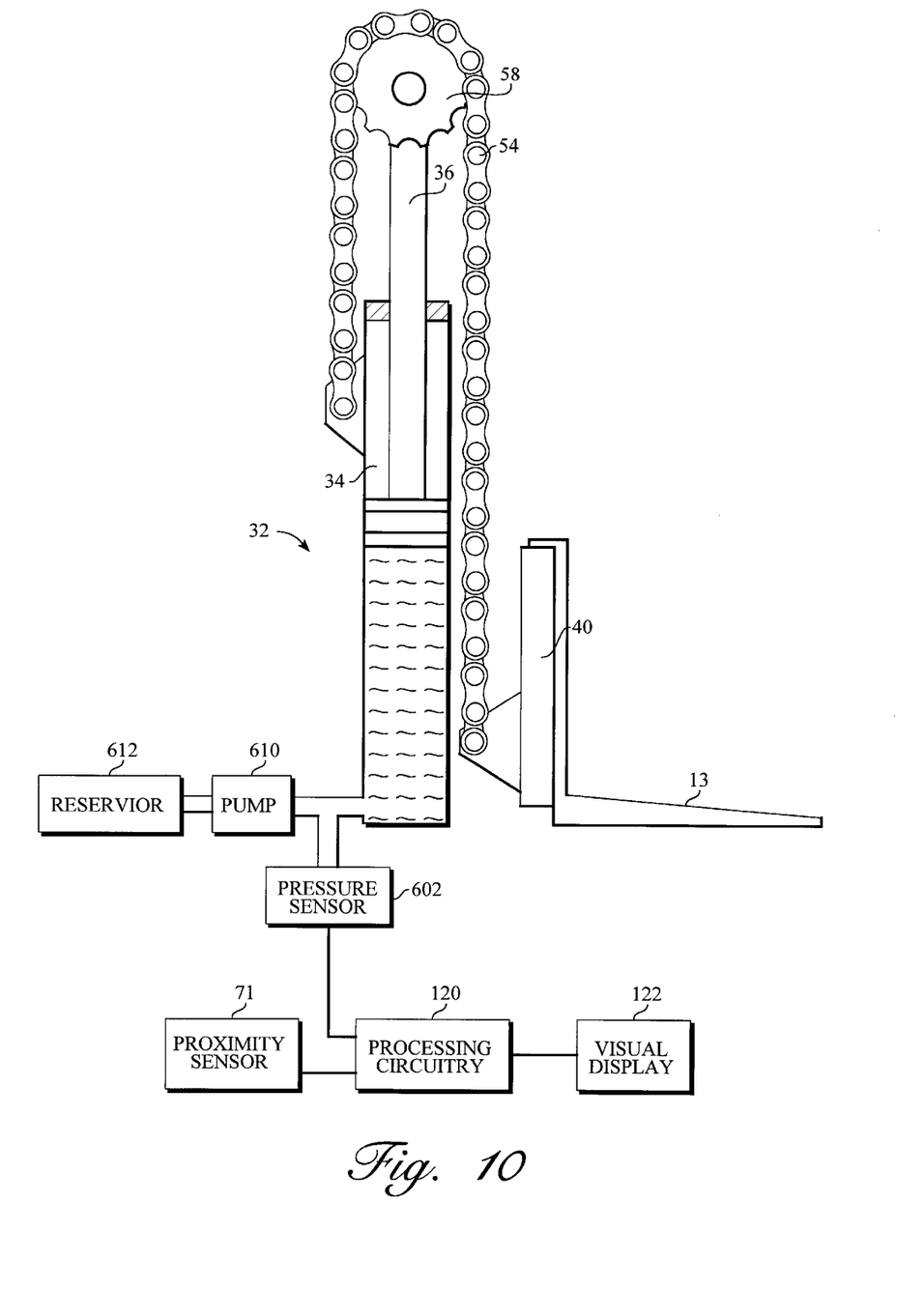
FIG. 10 shows the use of a pressure gauge in the hydraulic system for sensing force.

Referring to FIGS. 2 and 10, the hydraulic ram 32 includes a hydraulic pump 610 which pumps hydraulic fluid between a reservoir 612 and the cylinder 34 to raise or lower the piston rod 36. During lifting or lowering, variations in the tension in chain 54 (56) will be transmitted to the piston rod 36 by virtue of the mechanical connection of the sprocket-wheel 58 and the chain. Therefore, the pressure of the hydraulic fluid will vary in the manner as discussed in connection with Eqn. 1. Thus, an alternative to the use of force measurements provided by load cells 78 and 80, is the use of pressure readings taken by a pressure sensor 602 which can be accumulated in processor 120 and averaged. A subsequent conversion, namely multiplication by the cross-sectional area of cylinder 34, of the averaged pressure readings is then made to arrive at the corresponding weight of the load.

The detected fluid pressure is defined by the relation:

$$P = \frac{(1+k)W}{gA}\frac{d^2x}{dt} + B\frac{dx}{dt} + \frac{(1+k)W}{A}, \tag{6}$$

where;

P is the pressure of the hydraulic fluid,

W is the weight of the load,

A is the effective area of piston 36,

B is a coefficient of friction of the piston seal, g is the acceleration due to gravity, and k is a factor ($\approx 1$) that varies with the geometry of roller 58.

From Eqn. 6 it can be seen that the preferable mode of operation of the hydraulic lift is to maintain a constant velocity. This way the acceleration term drops out, thus avoiding the need to make acceleration calculations.

In addition, it is desirable to determine the coefficient of friction term B. This allows the forklift to be operated at different velocities while still producing accurate weight measurements. The coefficient of friction term can be determined by noting that, absent the acceleration term, Eqn. 6 is simply a linear equation of the form y=mx+b. Thus, the coefficient B is computed first by taking a pressure reading while lifting a load at one constant velocity and taking another pressure reading while lifting the same load at another constant velocity. The ratio of the difference between pressure readings to the difference between lifting velocities is the coefficient of friction B.

As can be seen, the means by which the weight of the load is sensed is not crucial to the invention. For example, a direct measurement such as the use of transducers 78 and 80 coupled to the chain 54 can be used. Similarly, an indirect measurement such as the pressure readings from the hydraulic system can is equally effective. It is important only that the force which is sensed reflects the variations in detected load caused by the sprocket-wheel and chain combination as discussed in connection with Egn. 1.

What is claimed is:

1. A device for lifting a load, comprising:

a frame;

a sprocket-wheel attached to said frame and having an axis of rotation;

a hydraulically operated carriage operationally coupled to said sprocket-wheel for movement relative to said frame;

a load bearing member connected to said carriage and adapted to engage said load;

sensing means for measuring a force exerted by said load, the magnitude of which varies with rotational movement of said sprocket-wheel as said load is moved, said sensing means including a pressure sensing device coupled to measure hydraulic pressure in said hydraulically operated carriage;

detection means for indicating an occurrence of a predetermined amount of rotational movement of said sprocket-wheel; chain passing over said sprocket-wheel, said chain having a Plurality of links, each link including two spaced-apart rollers wherein radii extending from the centers of said rollers to said axis of rotation subtend an angle 2θ, said predetermined amount of rotational movement being an even multiple of θ; and processing means, electronically coupled to receive force measurements from said sensing means and to receive an output from said detection means, for computing an average value of a sequence of force measurements taken during said predetermined amount of rotational movement;

whereby said average value is proportional to the weight of said load.

2. The system as recited in claim 1 wherein said processing means computes a sequence of weight measurements from said sequence of force measurements and computes said weight of said load by computing an average weight value from said sequence of weight measurements.

3. The system as recited in claim 1 wherein said sensing means also includes a force transducer coupled to measure the tension in said chain.

4. The system as recited in claim 1 wherein said detection means includes a photoelectric detector.

5. The system as recited in claim 1 wherein said detection means includes a magnetic detector.

6. A device for lifting a load, comprising:

a frame having a hydraulically operated extending member;

a sprocket-wheel attached to said extending member and having an axis of rotation;

a carriage slidably coupled to said frame for movement relative thereto;

a linkage member passing over said sprocket-wheel, one end of which is fixed relative to said frame, another end of which is coupled to said carriage, the linkage member characterized by a Ditch distance separating adjacent links of the linkage member;

a load bearing member connected to said carriage and adapted to engage said load; and means for sensing hydraulic pressure during movement of said load, thereby producing a plurality of pressure measurements;

a detector having an output indicating an occurrence of a predetermined amount of rotational movement of said sprocket-wheel, said predetermined amount of movement corresponding to movement of said linkage member by a multiple of the characteristic ditch of the linkage member; and processing means, coupled to receive said pressure measurements from said means for sensing and to receive said output from said detector, for computing an average value of a set of pressure measurements sensed during said predetermined amount of rotational movement of said sprocket-wheel, whereby said average value represents the weight of said load.

7. The system as recited in claim 6 wherein said detector includes a reflective strip fixed relative to said carriage and a photoelectric detector fixed relative to said frame and in optical communication with said reflective strip during a portion of said movement of said load.

8. The system as recited in claim 6 wherein said detector includes a magnetic strip fixed relative to said carriage and a magnetic detector fixed relative to said frame and in magnetic communication with said magnetic strip during a portion of said movement of said load.

9. The system as recited in claim 6 wherein said processing means computes a set of weight measurements from said set of pressure measurements and computes said weight of said load by computing an average weight value from said set of weight measurements.

10. In a lifting device comprising a frame having an extendible portion, a hydraulic unit coupled to move said extendible portion, a carriage coupled to said extendible portion to provide movement relative to said frame, a sprocket-wheel attached to said extendible portion and rotatable about a wheel axis, a linked chain passing over said sprocket-wheel and having a first end fixed relative to said frame and a second end fixed relative to said carriage, a load bearing member connected to said carriage for movement relative to said frame and adapted to engage said load, said linked chain further having a plurality of links, each link including a pair of spaced apart rollers, a method of determining the weight of said load comprising steps of:

computing a coefficient of friction of said hydraulic unit, including:
i) taking a first pressure measurement while moving a test load at a first constant velocity;
ii) taking a second pressure measurement while moving said test load at a second constant velocity; and
iii) taking a ratio of a difference between said first and second pressure measurements and a difference between said first and second velocities;

measuring pressure in said hydraulic unit during movement of said load, said pressure varying during said movement, said pressure being a function of the weight of said load and said coefficient of friction;

performing said step of measuring over a predetermined distance of movement of said load, thereby accumulating a plurality of pressure measurements, the predetermined distance being a multiple of the separation between the pairs of rollers of each link of the chain;

computing an average pressure by averaging said pressure measurements; and computing the weight of said load based on said average pressure and said coefficient of friction.

* * * * *